(12) United States Patent
Minegishi et al.

(10) Patent No.: US 10,343,694 B2
(45) Date of Patent: Jul. 9, 2019

(54) VEHICLE DRIVE ASSISTANCE SYSTEM

(71) Applicant: Mazda Motor Corporation, Aki-gun, Hiroshima (JP)

(72) Inventors: Yuka Minegishi, Hatsukaichi (JP); Keiichi Tomii, Hiroshima (JP); Takahiro Tochioka, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/896,332

(22) Filed: Feb. 14, 2018

(65) Prior Publication Data

US 2018/0281807 A1    Oct. 4, 2018

(30) Foreign Application Priority Data

Mar. 30, 2017    (JP) .................. 2017-068379

(51) Int. Cl.
| | |
|---|---|
| *B60Q 1/00* | (2006.01) |
| *B60W 40/08* | (2012.01) |
| *B60W 50/12* | (2012.01) |
| *G06K 9/00* | (2006.01) |

(52) U.S. Cl.
CPC ............ *B60W 40/08* (2013.01); *B60W 50/12* (2013.01); *G06K 9/00315* (2013.01); *G06K 9/00791* (2013.01); *G06K 9/00845* (2013.01); *B60W 2040/0818* (2013.01)

(58) Field of Classification Search
CPC ................ B60W 40/08; B60W 50/12; B60W 2040/0818; G06K 9/00845
See application file for complete search history.

(56) References Cited

U.S. PATENT DOCUMENTS

| 6,044,321 A * | 3/2000 | Nakamura | ......... B60K 31/0008 |
|---|---|---|---|
| | | | 180/179 |
| 2003/0195704 A1* | 10/2003 | Sekiguchi | ............. B60W 30/16 |
| | | | 701/301 |
| 2006/0155469 A1* | 7/2006 | Kawasaki | ............. B60R 21/013 |
| | | | 701/301 |

(Continued)

FOREIGN PATENT DOCUMENTS

| JP | 2015110417 A | * | 6/2015 |
|---|---|---|---|
| JP | 2015110417 A |   | 6/2015 |

*Primary Examiner* — Quang Pham
(74) *Attorney, Agent, or Firm* — Alleman Hall Creasman & Tuttle LLP

(57) ABSTRACT

A vehicle drive assistance system is provided, which includes a processor configured to execute a required driving ability estimating module to estimate a driver's driving ability required for driving a vehicle based on a traffic environment around the vehicle and drive assistance provided to the driver by the vehicle, a current driving ability estimating module to estimate a driver's current driving ability, and a changing module to perform reduction processing in which the required driving ability is reduced when the current driving ability is lower than the required driving ability, the required driving ability being reduced less in a case where the current driving ability is lower than a given threshold compared to a case where the current driving ability is equal to or higher than the given threshold, even when a difference between the required driving ability and the current driving ability is constant.

4 Claims, 11 Drawing Sheets

(56) References Cited

U.S. PATENT DOCUMENTS

| | | | |
|---|---|---|---|
| 2009/0248270 A1* | 10/2009 | Sekiguchi | B60W 10/06 701/96 |
| 2014/0018974 A1* | 1/2014 | Okita | B60W 30/20 701/1 |
| 2014/0212849 A1* | 7/2014 | Naiwala | G09B 9/052 434/66 |
| 2015/0039186 A1* | 2/2015 | Okuda | B60W 50/14 701/41 |
| 2016/0029940 A1* | 2/2016 | Iizuka | B60W 50/12 701/23 |
| 2017/0232973 A1* | 8/2017 | Otake | B60W 50/082 701/43 |
| 2017/0261974 A1* | 9/2017 | Ebe | G05D 1/0005 |
| 2017/0322046 A1* | 11/2017 | Gordon | G08G 1/09 |
| 2017/0369053 A1* | 12/2017 | Nogimori | B60T 7/12 |
| 2017/0369056 A1* | 12/2017 | Arai | G08G 1/01 |

* cited by examiner

| LARGE CLASS | MIDDLE/SMALL CLASS | | PROCESSING (EXAMPLE) |
|---|---|---|---|
| D UP | INFO-RELATED (+1 TO +5) | BIRD'S-EYE INFO PRESENTATION | MAP SCALE-DOWN DISPLAY |
| | | INFO AMOUNT INCREASE | DETAILED DISPLAY, DRIVE ASSISTANCE ALARM ISSUANCE |
| | | LINE-OF-SIGHT LEADING | LINE-OF-SIGHT LEADING OFF |
| | AUTONOMOUS DRIVE (+1 TO +5) | | AUTO DRIVE ASSISTANCE MODE OFF, THRESHOLD CHANGE |
| | OTHER (+1 TO +5) | | DIFFICULT ROUTE SETTING, VOLUME DOWN |
| D DOWN | INFO-RELATED (-1 TO -5) | LOCAL INFO PRESENTATION | MAP SCALE-UP DISPLAY |
| | | INFO AMOUNT REDUCTION | SIMPLIFIED DISPLAY |
| | | LINE-OF-SIGHT LEADING | LINE-OF-SIGHT LEADING ON |
| | AUTONOMOUS DRIVE (-1 TO -10) | | AUTO DRIVE ASSISTANCE MODE ON, THRESHOLD CHANGE |
| | OTHER (-1 TO -5) | | LANE CHANGE VOICE GUIDANCE, BREAK, SUN-VISOR, VOLUME UP |

FIG. 4

| LARGE CLASS | PROCESSING (EXAMPLE) |
|---|---|
| P UP (+1 TO +5) | MUSIC, SCENT, BREAK |
| P DOWN (-1 TO -5) | — — — — |

VEHICLE DRIVE ASSISTANCE SYSTEM

TECHNICAL FIELD

The present disclosure relates to a vehicle drive assistance system, and particularly to a vehicle drive assistance system that provides drive assistance according to a driving workload and a driving skill.

BACKGROUND OF THE DISCLOSURE

For example, JP2015-110417A discloses a drive assistance device that increases a degree of assistance of a driving operation (e.g., a degree of assistance when parking) when a driving skill of a vehicle driver is insufficient against a required level corresponding to an environmental difficulty based on an outside environment.

However, simply increasing the degree of assistance of driving does not enhance the driving skill of the driver. Especially, providing autonomous drive assistance to a driver with a low driving skill removes the opportunity to drive and the driving skill may be prevented from enhancing.

SUMMARY OF THE DISCLOSURE

The present disclosure is made in view of solving the issues described above, and aims to provide a drive assistance system, which enhances a driving skill of a vehicle driver through drive assistance.

According to one aspect of the present disclosure, a vehicle drive assistance system is provided, which includes a processor configured to execute a required driving ability estimating module to estimate a driver's driving ability required for driving a vehicle based on a traffic environment around the vehicle and drive assistance provided to the driver by the vehicle, a current driving ability estimating module to estimate a driver's current driving ability, and a changing module to perform reduction processing in which the required driving ability is reduced when the current driving ability is lower than the required driving ability. The required driving ability is reduced less in a case where the current driving ability is lower than a given threshold compared to a case where the current driving ability is equal to or higher than the given threshold even when a difference between the required driving ability and the current driving ability is constant.

With the above configuration, the reduction amount of the required driving ability is smaller when the current driving ability is lower than the given threshold than when the current driving ability is equal to or higher than the given threshold. Therefore, a driver who is estimated to have low driving skill drives in a situation where the drive assistance is only slightly insufficient, and thus an enhancement of the driving skill is facilitated.

When the current driving ability is equal to or higher than the given threshold, the changing module may perform, as the reduction processing, autonomous drive processing in which one or more autonomous drive control systems are activated. When the current driving ability is lower than the given threshold, the changing module may perform, as the reduction processing, facilitating processing in which the driver is facilitated to comprehend the traffic environment.

With the above configuration, when the driving skill of the driver is high, the required driving ability is lowered by the autonomous drive processing without aiming for enhancing the driving skill, and when the driving skill of the driver is low, the driving skill is enhanced by facilitating comprehension of the situation of the traffic environment by the driver himself/herself.

The facilitating processing may include information amount reduction processing in which an amount of information presented to the driver by an on-board information presentation device is reduced.

With the above configuration, since the information presentation amount by the on-board information presentation device is reduced, the information processing amount which needs to instantly be processed by the driver while driving is reduced. Therefore, for example, by narrowing the information presentation to high priority information, the driver is facilitated to comprehend the situation, and as a result, the required driving ability is lowered.

When the current driving ability is lower than the given threshold, the changing module may preferentially perform line-of-sight leading processing in which the driver's line of sight is led to a given position ahead of the vehicle by a line-of-sight leading device, over other types of facilitating processing, the line-of-sight leading processing being included in the facilitating processing.

The driver who has a relatively low current driving ability tends to have his/her line of sight to a close position to the vehicle, and therefore, the required driving ability is effectively reduced by leading the line of sight. For this reason, with the above configuration, for the driver with low current driving ability, the line-of-sight leading processing is preferentially selected.

The current driving ability estimating module may estimate the current driving ability based on drive history data of the vehicle, and at least one of a physical state and a mental state of the driver.

BRIEF DESCRIPTION OF THE DRAWINGS

FIG. 4 is a diagram illustrating a change table (driving demand) according to the embodiment of the present disclosure.

FIG. 5 is a diagram illustrating a change table (driving performance) according to the embodiment of the present disclosure.

DETAILED DESCRIPTION OF THE DISCLOSURE

Figure 1:
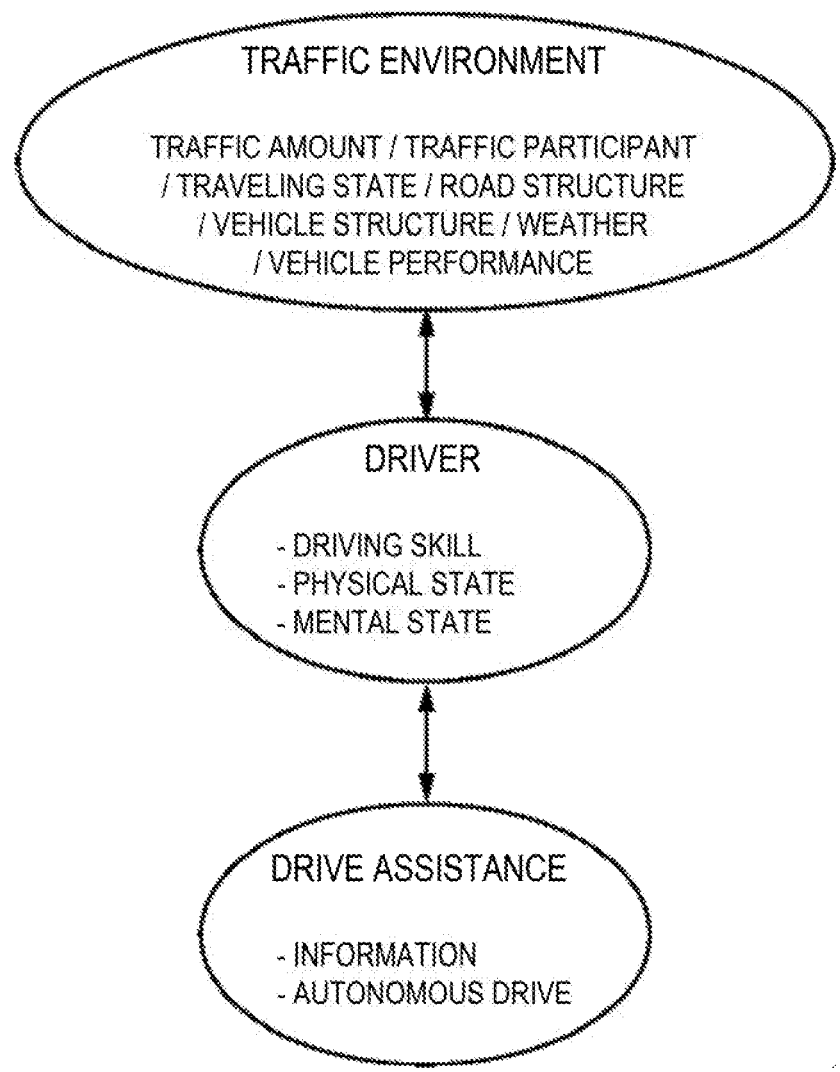
FIG. 1 is a diagram illustrating a relationship among a traffic environment, a driver and drive assistance according to one embodiment of the present disclosure.
Figure 2:
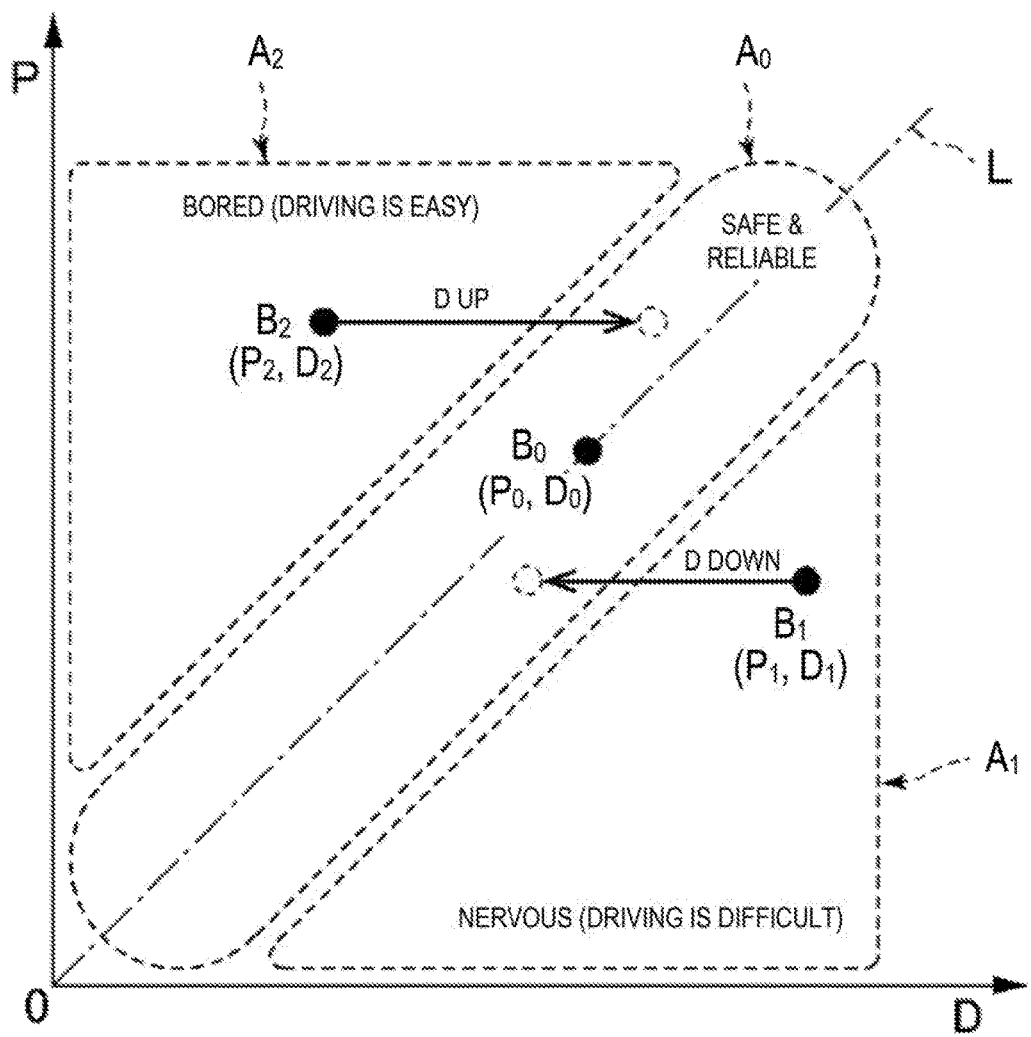
FIG. 2 is a chart illustrating a relationship between a driving demand and a driving performance according to the embodiment of the present disclosure.

Hereinafter, a vehicle drive assistance system according to one embodiment of the present disclosure is described with reference to the accompanying drawings. First, a driving demand and a driving performance used in the vehicle drive assistance system are described with reference to FIGS. 1 and 2. FIG. 1 is a diagram illustrating a relationship among a traffic environment, a vehicle driver, and drive assistance, and FIG. 2 is a chart illustrating a relationship between the driving demand and the driving performance.

As illustrated in FIG. 1, the driver is required to drive a vehicle to adapt to the traffic environment. The traffic environment involves various elements, such as a traffic amount (e.g., an intersection with a large traffic amount), a road structure (e.g., a road width and complexity of crossroads), weather (e.g., a wet road surface), a traffic participant (e.g., a child rushing out), a traveling state (e.g., a distance from the vehicle to another vehicle), a vehicle structure (e.g., a difference between an AT vehicle and an MT vehicle and the size of the vehicle), and vehicle performance (e.g., brake functionality). Therefore, according to the various elements of the traffic environment, the driver is required to have sufficient driving ability for adapting to the traffic environment (e.g., a careful steering operation, an attention to a rush-out of traffic participants, an attention to behaviors of other vehicles, and an attention to a blind angle).

Further, the driver receives various kinds of drive assistance from various on-board devices. The drive assistance mainly includes a drive assistance regarding information presentation (information-related drive assistance) and a drive assistance by an autonomous drive control system (autonomous drive assistance). These kinds of drive assistance lower the driving ability required for the traffic environment. In this embodiment, by taking into consideration this lowered amount by the drive assistance, the actual required driving ability for the traffic environment is defined as driving demand D (required driving ability).

Driving demand $D$=Traffic environment factor $Dt$−Drive assistance factor $Da$

Drive assistance factor $Da$=Information-related factor $Di$+Autonomous driving factor $Dd$ Meanwhile, the driver has a driving skill (technique) for driving the vehicle, adapting to such a traffic environment. However, the driving skill may not always be demonstrated fully depending on a physical (body) state or a mental (mind) state of the driver. In this embodiment, the driving ability actually demonstrated at a current timing based on the driving skill, the physical state, and the mental state is defined as driving performance P (current driving ability).

Driving performance $P$=Driving skill factor $Ps$−Physical factor $Pp$−Mental factor $Pm$ FIG. 2 illustrates the relationship between the driving demand D and the driving performance P. Within an area $A_1$ (e.g., point $B_1$), the driving demand D is higher than the driving performance P (P<D). As the difference between P and D increases, the driving workload increases, which causes the driver to feel that driving is difficult and thus he/she easily feels nervous. Additionally, the driver feels stressed within the area $A_1$, thus he/she easily feels fatigued. Therefore, it is not suitable for driving for a long time.

Within an area $A_2$ (e.g., point $B_2$), the driving performance P is higher than the driving demand D (P>D). As the difference between P and D increases, the driving workload decreases, which causes the driver to feel that driving is easy, thus he/she easily feels unsatisfied or bored. When the driver feels bored, he/she may perform a secondary task (i.e., an action/operation other than driving) such as being inattentive to the driving, be distracted and become less focused on driving, or be less motivated to drive. Thus, the driving performance may degrade.

On a straight line L and its peripheral area $A_0$ (e.g., point $B_0$), the driving demand D and the driving performance P are in balance (ideal state; P=D). In this balanced state, enjoyment and safety of the driving operation are obtained and reliability toward the vehicle is easily built.

Therefore, in this embodiment, when a relation point between the driving performance P and the driving demand D (a relationship between the driver and the traffic environment) is estimated to be located within the area $A_1$ or the area $A_2$, D (or P if needed) is adjusted to move this relation point into the area $A_0$. For example, in the case of the point $B_1$ ($P_1$<$D_1$), processing of reducing D and/or processing of increasing P is performed, and in the case of the point $B_2$ ($P_2$>$D_2$), processing of increasing D and/or processing of reducing P is performed.

In the reduction processing of the driving demand D, mainly the information-related factor Di and the autonomous driving factor Dd are increased. In the increase processing of the driving demand D, on the contrary, mainly the information-related factor Di and the autonomous driving factor Dd are reduced. In the increase processing of the driving performance P, the lowered amount of the driving ability caused by the physical factor Pp and the mental factor Pm is reduced, in other words, the amount of the driving performance P degraded by the physical factor Pp and the mental factor Pm is reduced.

Next, a configuration of the vehicle drive assistance system is described with reference to FIG. 3, which is a block diagram of the vehicle drive assistance system.

Figure 3:
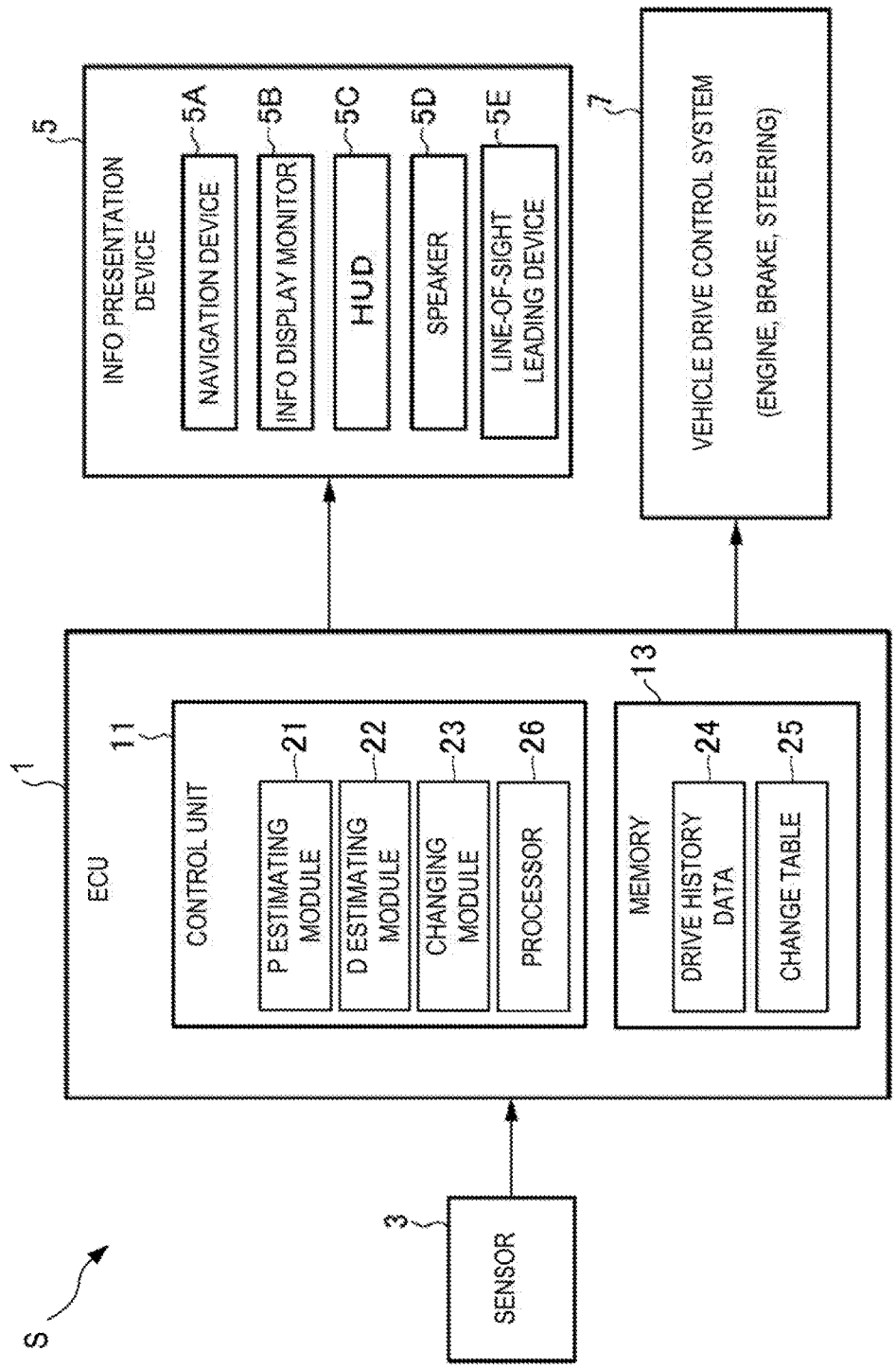
FIG. 3 is a block diagram of a drive assistance system according to the embodiment of the present disclosure.

As illustrated in FIG. 3, a vehicle drive assistance system S includes an on-board controller 1 (ECU (Electronic Control Unit)), a vehicle sensor 3, an information presentation device 5, and a vehicle drive control system 7.

The on-board controller 1 includes a control unit 11, memory 13 and a communication unit (not illustrated), and controls the information presentation device 5 and the vehicle drive control system 7 based on sensor data acquired from the vehicle sensor 3. For example, the on-board controller 1 controls an engine output via the vehicle drive control system 7 based on an accelerator opening (sensor data).

The vehicle sensor 3 is comprised of various information acquiring devices. The vehicle sensor 3 includes an in-vehicle camera 3a, a biological sensor, a microphone, an external camera, a radar, a navigation device, a vehicle behavior sensor, a driver operation detection sensor, an inter-vehicle communicator, and a vehicle-to-infrastructure communicator.

The in-vehicle camera captures images of the driver and other passenger(s) in the vehicle, and outputs in-vehicle image data.

The biological sensor measures a heart rate, pulse, sweat, electroencephalogram, etc. of the driver, and outputs biological data.

The microphone collects voices of the driver and the other passenger(s), and outputs voice data.

The external camera captures images of the front, left, right and rear sides of the vehicle, and outputs external image data.

The radar emits radio waves, sound waves or laser light toward the front, left, right and rear sides of the vehicle, receives reflection waves from an object located around the vehicle (a preceding vehicle, another vehicle, a pedestrian, a fixed object on the ground, an obstacle, etc.), and outputs external object data of a relative position, relative speed, etc. of the object (e.g., a position, relative speed, etc. of the preceding vehicle).

The navigation device acquires the vehicle position information and outputs navigation data (a plurality of route information, route information selected by the driver, etc.) in combination with internal map information, and traffic jam information acquired externally, and input information (destination, way point, etc.).

The vehicle behavior sensor and the driver operation detection sensor include a speed sensor, a longitudinal acceleration sensor, a lateral acceleration sensor, a yaw rate sensor, an accelerator opening sensor, an engine speed sensor, an AT gear position sensor, a brake switch sensor, a brake hydraulic pressure sensor, a steering angle sensor, a steering torque sensor, a turn signal switch position sensor, a wiper switch position sensor, a light switch position sensor, internal and external temperature sensors, etc.

The inter-vehicle communicator and the vehicle-to-infrastructure communicator acquire communication data from other vehicles, and traffic data (traffic jam information, limit speed information, etc.) from the traffic infrastructure, and output them.

The information presentation device 5 includes a plurality of devices. The information presentation device 5 includes a navigation device 5A, an information display monitor 5B provided in an instrument panel, a HUD (Head-Up Display) 5C provided on a dashboard, a speaker 5D, a line-of-sight leading device 5E, a lamp provided to a meter, etc. The information display monitor 5B displays warning information, driving operation coaching information, driving operation advice information, etc. The HUD 5C displays projections of speed information and other information on a windshield. The speaker 5D outputs voice guidance according to output signals of the on-board controller 1 and an audio device. The line-of-sight leading device 5E leads the line of sight of the driver to an area far ahead of the vehicle.

The vehicle drive control system 7 controls an engine, a brake, and a steering device. In various autonomous drive assistance modes, the engine, the brake, and the steering device are automatically operated via the vehicle drive control system 7.

The autonomous drive assistance modes typically include a lane keeping assistance mode, an automatic speed control mode, and a preceding vehicle following mode.

In the lane keeping assistance mode, the steering device is automatically controlled to prevent the vehicle from deviating from a traffic lane.

In the automatic speed control mode, the engine is automatically controlled to keep the vehicle traveling at a given speed.

In the preceding vehicle following mode, the engine is automatically controlled to follow the preceding vehicle while keeping a given inter-vehicle distance. In this mode, the steering device is also automatically controlled so as to travel through the center of the traffic lane.

Figure 6:
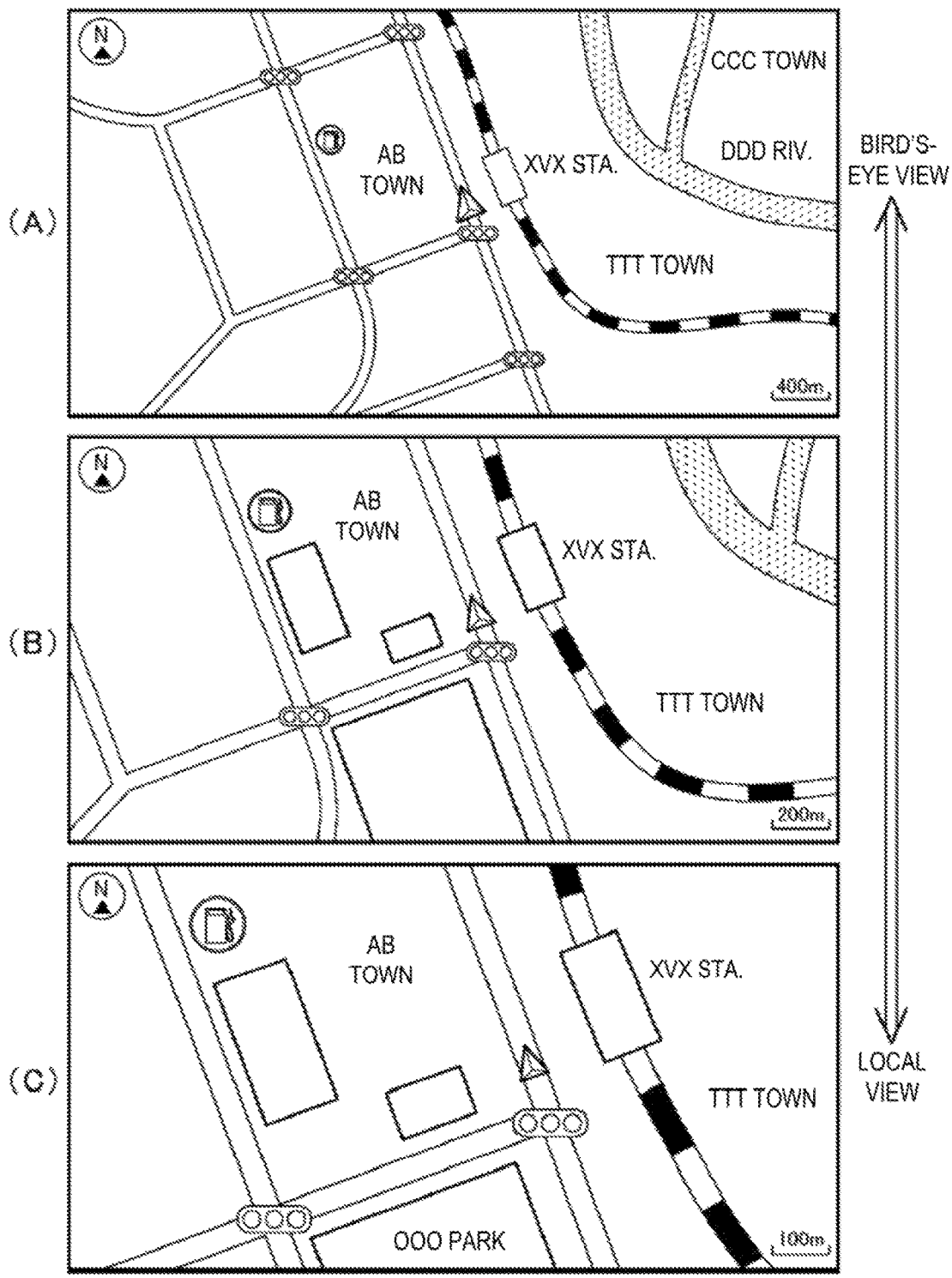
FIG. 6 shows views illustrating changes in a display mode of a navigation map according to the embodiment of the present disclosure.
Figure 7:
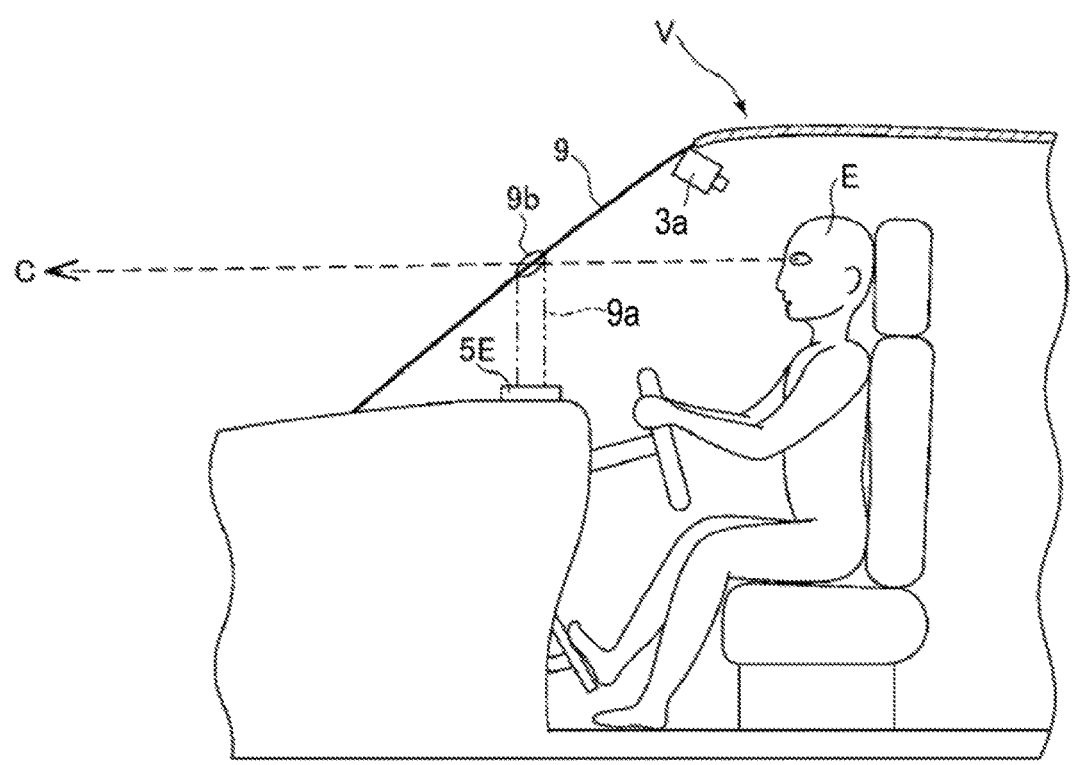
FIG. 7 is a diagram illustrating line-of-sight leading processing according to the embodiment of the present disclosure.

Next, a drive assist function of the on-board controller is described with reference to FIGS. 3 to 7. FIGS. 4 and 5 are diagrams of change tables, FIG. 6 shows views illustrating changes in a display mode of a navigation map, and FIG. 7 is a diagram illustrating line-of-sight leading processing.

The control unit 11 includes a P estimating module 21 (current driving ability estimating module), a D estimating module 22 (required driving ability estimating module), a changing module 23, and a processor 26. The processor 26 is configured to execute the P estimating module 21, the D estimating module 22, and the changing module 23 to perform their respective functions. The modules are stored in the internal memory (e.g., memory 13) as software programs. The memory 13 stores drive history data 24 and a change table 25. The drive history data 24 is accumulated data of the sensor data.

The P estimating module 21 estimates the current driving performance P (current driving ability) based on the drive history data 24. The D estimating module 22 estimates the driving demand D (required driving ability) based on the drive history data 24. The changing module 23 performs processing of increasing/reducing the driving demand D and the driving performance P based on the change table 25.

The P estimating module 21 typically evaluates operations of an accelerator, the brake and the steering device by the driver based on the drive history data 24 and calculates the driving skill factor Ps. It also calculates the degraded amount of the driving performance P (Pp, Pm) according to the state (physical and mental states) of the driver, and outputs a difference value between the calculated driving skill factor Ps and the calculated degraded amount as the current driving performance P. The method of calculating the respective factors is briefly described as follows.

For calculating the driving skill factor Ps, the sensor data of a vehicle speed, a longitudinal acceleration, a lateral acceleration, a yaw rate, the accelerator opening, an engine speed, an AT gear position, a brake switch, brake pressure, a steering angle, a steering torque, etc. is used. For example, each of acceleration stability, steering angle stability, vehicle speed stability, the brake timing, etc. is evaluated with a driving operation ideal model stored in the memory 13 and scored. The memory 13 constantly acquires the sensor data and updates the drive history data 24. According to this, the P estimating module 21 updates the driving skill factor Ps. Note that the driving skill factor Ps is not limited to be evaluated in the above method, and another evaluation method may be applied.

For calculating the physical factor Pp and the mental factor Pm, at least one of the in-vehicle image data, biological data, and voice data at the calculation timing is used. For example, the P estimating module 21 analyzes face expression and attitude of the driver by the in-vehicle image data. Additionally, stress, a nervous state, a fatigue state, etc. are analyzed based on the biological data (pulse, heart rate, sweat, etc.). Moreover, the emotional analysis is performed using an endocrine model based on the voice data. By these analyses, the physical state (drowsiness, fatigue degree, physical state, etc.) and the mental state (attention state, awareness, emotion, stress level, driving motivation, excitement, nervousness, etc.) of the driver are evaluated so as to calculate the physical factor Pp and the mental factor Pm. Note that the physical factor Pp and the mental factor Pm are not limited to be evaluated in the above method, and another evaluation method may be applied.

For example, the P estimating module 21 detects an eyelid movement from the image data and determines whether the driver is feeling drowsy based on the position of the eyelid. If feeling drowsy, the physical factor Pp is set to a given value. Further, if the driver is determined to be in the nervous state based on the emotional analysis based on the voice data, the mental factor Pm is set to a given value.

The D estimating module 22 evaluates a current traffic environment based on the sensor data (Dt) and evaluates an amount of the driving demand D lowered by the currently-active drive assistance, and outputs a scored driving demand D.

For calculating the traffic environmental factor Dt, the D estimating module 22 analyzes the traffic amount, road structure, weather, traffic participants, traveling state, vehicle structure, vehicle performance described above regarding the traffic environment, and calculates evaluation values thereof.

For example, evaluation base information regarding the traffic amount is obtained from the traffic data obtained by the vehicle-to-infrastructure communicator. Evaluation base information regarding the road structure (e.g., traffic lane width), the traffic participants (existence, number, and type) is obtained from the external image data obtained by the external camera. Evaluation base information regarding the road structure is obtained from map information obtained from the navigation device. Evaluation base information regarding the traveling state (e.g., inter-vehicle distance) is obtained from external object data obtained by a radar. Based on these evaluation base information, the D estimating module 22 evaluates the traffic environment by using a traffic environment conversion table that is stored in the memory 13, and scores it.

Moreover, for calculating the information-related factor Di of the drive assistance factor Da, the D estimating module 22 evaluates the information presentation performed by each information presentation device 5 (e.g., whether presented, a presentation mode, presented information, a presented timing, a presentation frequency, and a presentation determination threshold), and calculates the scored information-related factor Di. The memory 13 stores an information conversion table in which the information presentation by each information presentation device 5 is scored. The D estimating module 22 refers to this information conversion table for the evaluation of the information-related factor Di.

Moreover, for calculating the autonomous driving factor Dd of the drive assistance factor Da, the D estimating module 22 evaluates one or more autonomous drive assistance modes that are currently activated, and calculates a scored autonomous driving factor Dd. The memory 13 stores an autonomous drive conversion table in which each autonomous drive assistance mode is scored. The D estimating module 22 refers to this autonomous drive conversion table for the evaluation of the autonomous driving factor Dd.

Note that the driving operation ideal model, the traffic environment conversion table, the information conversion table, and the autonomous operation conversion table are set so that enjoyment and safety in driving are obtained and reliability toward the vehicle is built when the driving performance P and the driving demand D calculated in this manner are equal to each other.

The changing module 23 acquires the driving performance P from the P estimating module 21, acquires the driving demand D from the D estimating module 22, and performs the processing of increasing/reducing the driving demand D (and processing of increasing/reducing the driving performance P) based on the change table 25. For example, the changing module 23 outputs command signals to the information presentation devices 5, the vehicle drive control system 7, etc. corresponding to the respective processes. The change table 25 has a driving demand increase and reduction table 25A (FIG. 4), and a driving performance increase and reduction table 25B (FIG. 5).

As illustrated in FIG. 4, the driving demand increase and reduction table 25A is classified into increase processing (D UP) and reduction processing (D DOWN) of the driving demand D. Each class further includes small/middle class processes regarding "information-related," "autonomous drive" and "other."

The information-related processing is "information-related drive assistance." The increase processing performed by the information-related processing includes small class processes regarding "bird's-eye information presentation," "information amount increase," and "line-of-sight leading." The reduction processing performed by the information-related processing includes small class processes regarding "local information presentation," "information amount reduction," and "line-of-sight leading." Each of the small classes includes a plurality of processes. The increased or reduced amount of the driving demand D (the information-related factor Di or the autonomous driving factor Dd) by each processing is scored (not illustrated but examples of the general value are described in the middle classes). By performing the plurality of processes, the driving demand is reduced or increased by the amount corresponding to the total score thereof.

In the information-related processing, processing of facilitating or obstructing comprehension of the traffic situation by the driver is performed. Thus, the difficulty of the driver comprehending the traffic environmental situation is controlled and the driving demand D is increased/reduced accordingly. That is, while driving, the driver needs to instantly process necessary information. Therefore, when the information presentation is narrowed to required information for a driving operation concerned, since comprehending the situation becomes easy, the driving demand D drops (the reduction processing performed by facilitating comprehension of the traffic situation). On the other hand, when detailed information is presented, since comprehending the situation becomes difficult, the driving demand D rises (the increase processing performed by obstructing comprehension of the traffic situation).

The bird's-eye information presentation processing includes processing of controlling the navigation device 5A to display the map in a bird's-eye-view (remote view) presentation mode on a navigation screen. On the other hand, the local information presentation processing includes processing of controlling the navigation device 5A to locally display the navigation map. For example, as illustrated in FIG. 6, when the current map is displayed in an intermediate scale (see Part (B) of FIG. 6), the driving demand D is increased by reducing a display scaling level to display a wide area (display a bird's eye view; see Part (A) of FIG. 6), and the driving demand D is reduced, on the contrary, by raising the display scaling level to display a local area (display a local view: see Part (C) of FIG. 6). That is, it is evaluated that the degree of the drive assistance increases as the scale of the map shifts from the bird's eye view (detailed) to the local view (simplified). In the driving demand increase and reduction table 25A, the increase/reduction amount (score) of the driving demand D corresponding to the change of the display scaling level is defined.

Another example of the bird's-eye information presentation processing includes processing of controlling the navigation device 5A or other information presentation devices to display the following information in the bird's eye view: guidance for a traveling lane located ahead of a turn at an intersection guided in a route guidance; no intersection enlarged view in a route guidance at a right/left turn; a traveling lane guidance display on a list of traffic lanes; brief stop indication/railroad crossing indication/merge indication/lane reduction indication/frequent accident occurring point indication on guidance display; voice guidance for traffic jam information; voice guidance for multiple curve information, etc. By these processes, the information amount for the driver to process increases, and a demand for comprehending the situation increases. Note that the added information includes low priority information (e.g., traffic jam information).

Another example of the local information presentation processing includes processing of controlling the navigation device 5A or other information presentation devices to display the following information: an intersection enlarged view in a route guidance at a right/left turn; a complex intersection enlarged view; a grade-separated intersection enlarged view; a narrow road guidance display; an on-ramp image display, etc. By these processes, it becomes easy to comprehend the intersection and the road shape, and a demand for comprehending the situation (comprehending the shape) drops.

Still another example of the bird's-eye information presentation processing includes processing of controlling the navigation device 5A to change, on the navigation screen, the presentation mode of traffic information on a zone from a current position to an estimated arrival point after a set period of time (e.g., traffic jam state, estimated passing time, etc. of at each passing point). For example, it is extension processing of the current set period of time. Specifically, the presentation of traffic information for 60 minutes from a current time point is changed to presentation of traffic information for two hours. Still another example of the local information presentation processing is, contrary to the previous example, presentation processing of traffic information on a smaller zone. For example, the presentation of traffic information for 60 minutes from the current time point is changed to presentation of traffic information for 30 minutes.

The information amount increase processing includes processing of controlling the information presentation device 5 to perform the following processing, for example: turning on a given display lamp; switching a display mode of a given display device (from the simplified view to the detailed view); increasing a displayed number of continuous curves (displaying up to the second curve); and lowering a threshold for drive assistance alarm issuance. By these processes, the information amount for the driver to process and the number of confirmations (decisions, controls, etc.) increases. The drive assistance alarm suggests the driver to take a break based on a determination of fatigue and declined attentiveness of the driver by using the image data (in the processing described above, a determination threshold for fatigue or attentiveness declination is lowered), or informs of a vehicle approach from the rear side (in the processing described above, an approach determination threshold distance is extended).

The information amount reduction processing is processing of reducing the information presentation amount to the driver and includes processing of controlling the information presentation device 5 to perform the following processing, for example: turning off a given display lamp (an operation lamp of a driving skill evaluation device); changing the location of the information display from a meter panel to the HUD 5C; switching a display mode on a given display device (from the detailed display to the simplified display); and raising the threshold for the drive assistance alarm issuance. Note that the display mode switch includes stopping the information display itself and reducing the number of displayed information items. By these processes, the low priority information is no longer displayed and the information amount for the driver to process decreases. Moreover, by changing the display location from the meter panel to the HUD 5C, a demand for shifting the line of sight to the meter panel (looking down) drops.

Further, the line-of-sight leading processing is processing of controlling activation/deactivation of the line-of-sight leading device that promotes changing the viewing direction of the driver. By activating the line-of-sight leading device, comprehension of the traffic situation by the driver is facilitated. Note that the line-of-sight leading processing has an effect for reducing the driving demand D and enhancing the driving performance P.

As illustrated in FIG. 7, the line-of-sight leading device 5E is provided on a dashboard of a vehicle V and emits a spot light 9a upwardly to generate a line-of-sight leading point 9b (eye point) on a windshield 9. By viewing outside the vehicle through the line-of-sight leading point 9b, the line of sight C of the driver E is led to a given position ahead of the vehicle (around 150 to 250 m, or 200 m, ahead of the vehicle). The generation position of the line-of-sight leading point 9b is set according to the position (e.g., height position) of the eye of the driver E. Further, the on-board controller 1 may estimate the eye position based on the image data of the driver E obtained by the in-vehicle camera 3a, and output a command signal so that the line-of-sight leading point 9b is generated at a suitable position. In this case, the line-of-sight leading device 5E adjusts an emission angle of the spot light 9a based on this command signal.

Generally, a driver with low driving skill has his/her line of sight at a position close to the vehicle (e.g., within 50 m ahead of the vehicle), and therefore, the level of comprehension of the traffic situation is low, and the understanding and time for responding to a change in the traffic situation is low and short, respectively. On the other hand, it is known that a driver with high driving skill has his/her line of sight to a far position from the vehicle (e.g., around 150 to 250 m ahead of the vehicle). With this line of sight, the traffic situation is easily comprehended and the driver reacts to the change in the traffic situation with sufficient understanding and time.

Note that the on-board controller 1 may calculate the line of sight based on the image data of the driver E obtained by the in-vehicle camera 3a. In this case, when the line of sight of the driver E is detected at the close position, the on-board controller 1 causes the line-of-sight leading device 5E to emit the spot light 9a. Further, in order to lead the line of sight to an even farther position in a stepwise fashion, the line-of-sight leading device 5E may change the emitting direction of the spot light 9a in a stepwise fashion.

The autonomous drive processing is "autonomous drive assistance." The autonomous drive processing includes processing of selectively implementing one or more of the plurality of autonomous drive assistance modes (the lane keeping assistance mode, the automatic speed control mode, and the preceding vehicle following mode) by the on-board controller 1. The driving demand D drops in this manner. On the other hand, the driving demand D is increased by deactivating the activated autonomous drive assistance mode. Generally, compared to the information-related processing and the other processing, the effect of the autonomous drive processing on the increase and reduction of the driving demand D is larger and the change amount (score) is larger.

Note that the autonomous drive assistance mode may include a hill-start assistance mode (prevent rolling to the opposite direction from a traveling direction when start traveling on a hill). Further, for example, in the automatic speed control mode, the driving demand D is increased by automatically raising the set speed, and the driving demand D is reduced by automatically lowering the set speed. In another example, to reduce the driving demand D, a determination threshold for executing a lane departure preventing control is changed so that it is executed when the vehicle is located far from a boundary of the traffic lane. On the other hand, to increase the driving demand D, the determination threshold is changed so that the lane departure preventing control is executed when the vehicle is located close to the boundary of the traffic lane.

The other processing includes processing of controlling the navigation device 5A to preferentially select a difficult route (e.g., with many curves) in the route search processing. The driving demand D increases in this manner. Further, the driving demand D may be reduced by causing the information presentation devices 5 to perform processing of performing voice guidance for the timing to change the traffic lane or processing of presenting guidance for taking a break suitably.

Moreover, as illustrated in FIG. 5, the driving performance increase and reduction table 25B is classified into increase processing (P UP) and reduction processing (P DOWN) of the driving performance P. The increase processing is, for example, processing of controlling the audio device to output music from the speaker to relax the driver, processing of controlling an air conditioner to release a flow of air with relaxing scent, processing of controlling the information presentation devices 5 to display or output an audio of a message suggesting the driver to take a break, processing of changing the seat position to lower the fatigue of the driver, etc. The reduction processing is not particularly specified. The increase of the driving performance P is achieved by cutting down the degraded amount caused by the physical factor Pp and the mental factor Pm.

Figure 8:
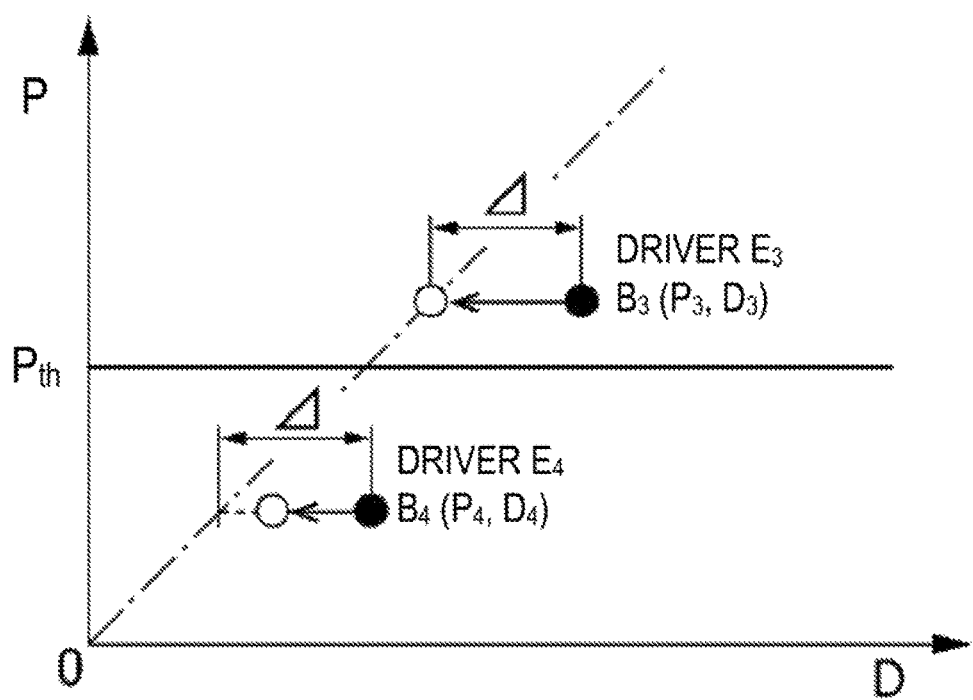
FIG. 8 is a chart illustrating drive assistance processing according to the embodiment of the present disclosure.
Figure 9:
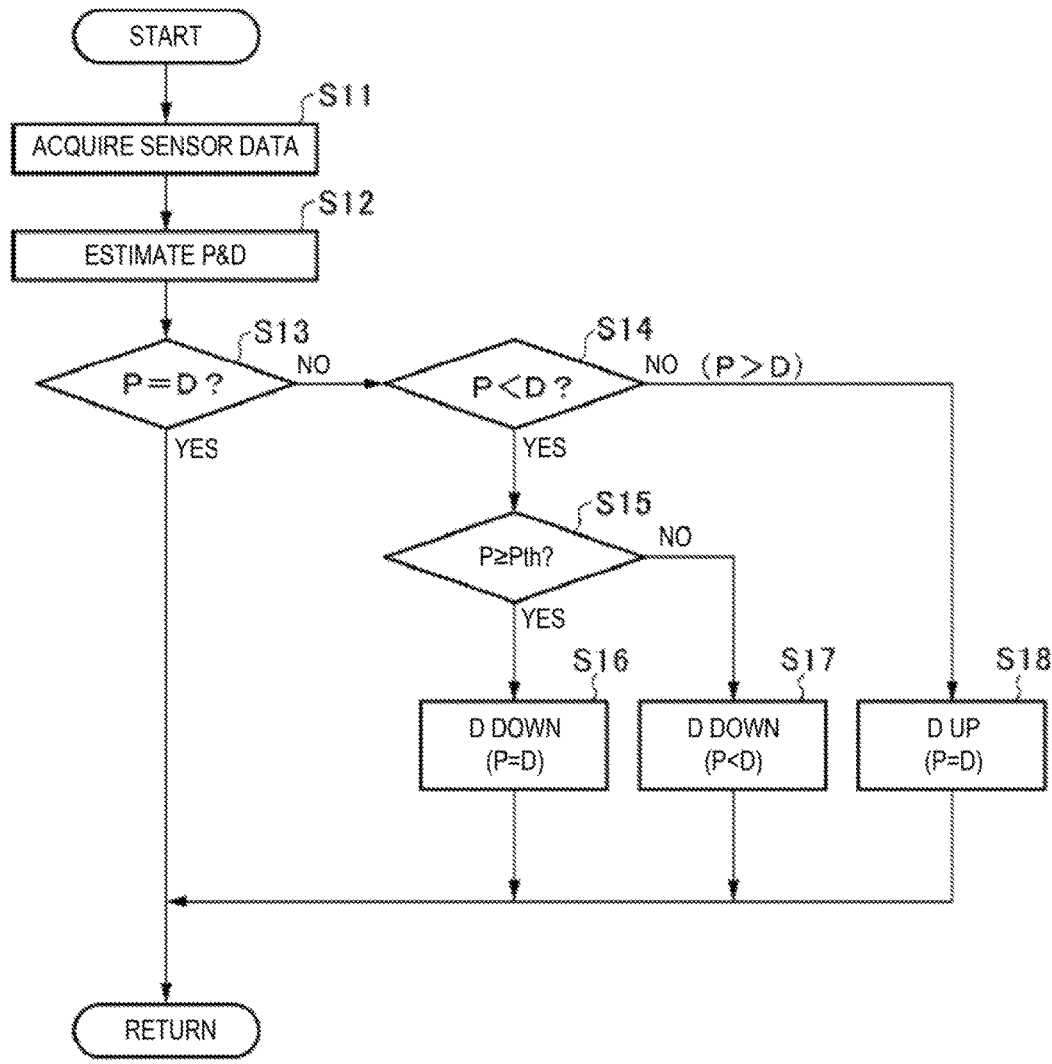
FIG. 9 is a flowchart of the drive assistance processing according to the embodiment of the present disclosure.

Next, processing of the vehicle drive assistance system is described with reference to FIGS. 8 and 9. FIG. 8 is a chart illustrating the drive assistance processing and FIG. 9 is a flowchart of the drive assistance processing.

FIG. 8 illustrates a situation where the reduction processing of the driving demand ("D DOWN" processing) is performed on two vehicle drivers $E_3$ and $E_4$. The driver $E_3$ has a high driving skill and exerts high driving performance $P_3$ which is equal to or higher than a given threshold $P_{th}$ ($P_3 \geq P_{th}$). The driver $E_4$ has a low driving skill and exerts driving performance $P_4$ which is lower than the given threshold $P_{th}$ ($P_4 < P_{th}$). The threshold $P_{th}$ is, for example, driving performance of a driver with a standard driving skill.

The driver $E_3$ is driving in a situation with the driving demand $D_3$ (point $B_3$; $P_3 < D_3$), and the driver $E_4$ is driving in a situation with the driving demand $D_4$ (point $B_4$; $P_4 < D_4$). Although the driving demand $D_3$ and $D_4$ are different from each other ($D_3 \neq D_4$), they are equally different from the driving performances $P_3$ and $P_4$, respectively ($\Delta = D_3 - P_3 = D_4 - P_4$).

In the case of the driver $E_3$ (i.e., when the driving performance is high), the control unit 11 performs the reduction processing to balance out $P_3$ and $D_3$. Therefore, one or more of the information-related, autonomous drive, and other processes are suitably selected as the reduction processing.

On the other hand, in the case of the driver $E_4$ (i.e., when the driving performance is low), the control unit 11 performs the reduction processing within a range that the driving demand does not drop until $P_4$ and $D_4$ come in balance. In this embodiment, a target reduction value of the driving demand is a value obtained by multiplying the difference $\Delta$ between $D_4$ and $P_4$ by a given coefficient k ($0<k<1$). The coefficient k may be, for example, between 0.4 and 0.8 according to the difference between $P_4$ and $P_{th}$. Thus, the driver $E_4$ drives in a situation where the driving demand slightly exceeds the driving performance ($P_4 < D_4$), and as a result, the driving skill enhances. In this case, one or more of the information-related, autonomous drive, and other processes are suitably selected as the reduction processing.

The on-board controller 1 (control unit 11) repeats the drive assistance processing illustrated in FIG. 9. First, the control unit 11 acquires the sensor data from the vehicle sensor 3 (S11) and estimates the current driving performance P and the current driving demand D based on the sensor data (S12). If the estimated P is in balance with D (S13: YES), the control unit 11 terminates the processing. Note that P being in balance with D includes a case where a difference between P and D is below a given value. For example, the control unit 11 may determine that P is in balance with D when the estimated values of P and D are within the area $A_0$ illustrated in FIG. 2.

On the other hand, if P is not in balance with D (S13: NO), the control unit 11 determines whether P is lower than D (S14). If P is lower than D (S14: YES), whether P is equal to or higher than the threshold $P_{th}$ is determined (S15). If P is equal to or higher than the threshold $P_{th}$ (S15: YES, corresponding to the case of the driver $E_3$ in FIG. 8), the control unit 11 selects suitable processing from the reduction processing of the driving demand ("D DOWN" processing) and performs it (S16). Here, one or more processes are selected from the reduction processing so that P and D come in balance.

If P is lower than the threshold $P_{th}$ (S15: NO, corresponding to the case of the driver $E_4$ in FIG. 8), the control unit 11 selects suitable processing from the reduction processing of the driving demand ("D DOWN" processing) and performs it (S17). In this case, one or more processes are selected from the reduction processing so that the driving demand does not drop until P and D come in balance.

If P is higher than D (S14: NO), the control unit 11 suitably selects one or more processes from the increase processing of the driving demand ("D UP" processing) and performs it (S18). In this case, one or more of the information-related, autonomous drive, and other processes are suitably selected and performed. Here, one or more processes are selected from the increase processing so that P and D come in balance.

In this manner, in this embodiment, according to the changes in the traffic environment and the condition of the driver (the driving skill, the physical state and the mental state), the driving demand D (and the driving performance P) is increased or reduced so that the driving demand D and the driving performance P have a suitable relationship.

Figure 10:
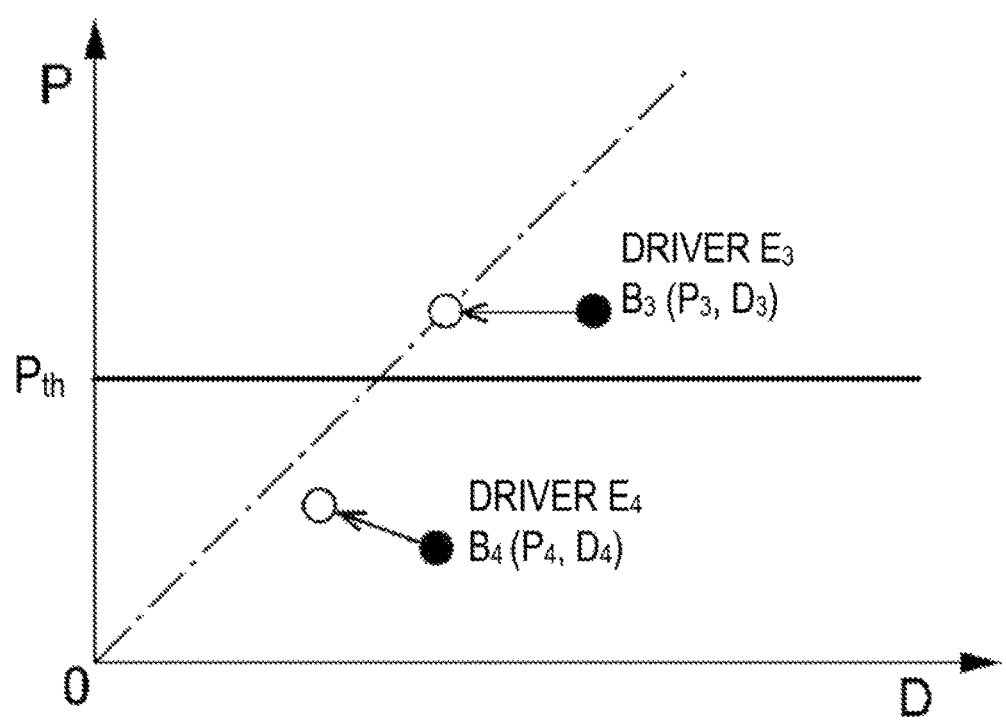
FIG. 10 is a chart illustrating drive assistance processing according to one modification of the present disclosure.
Figure 11:
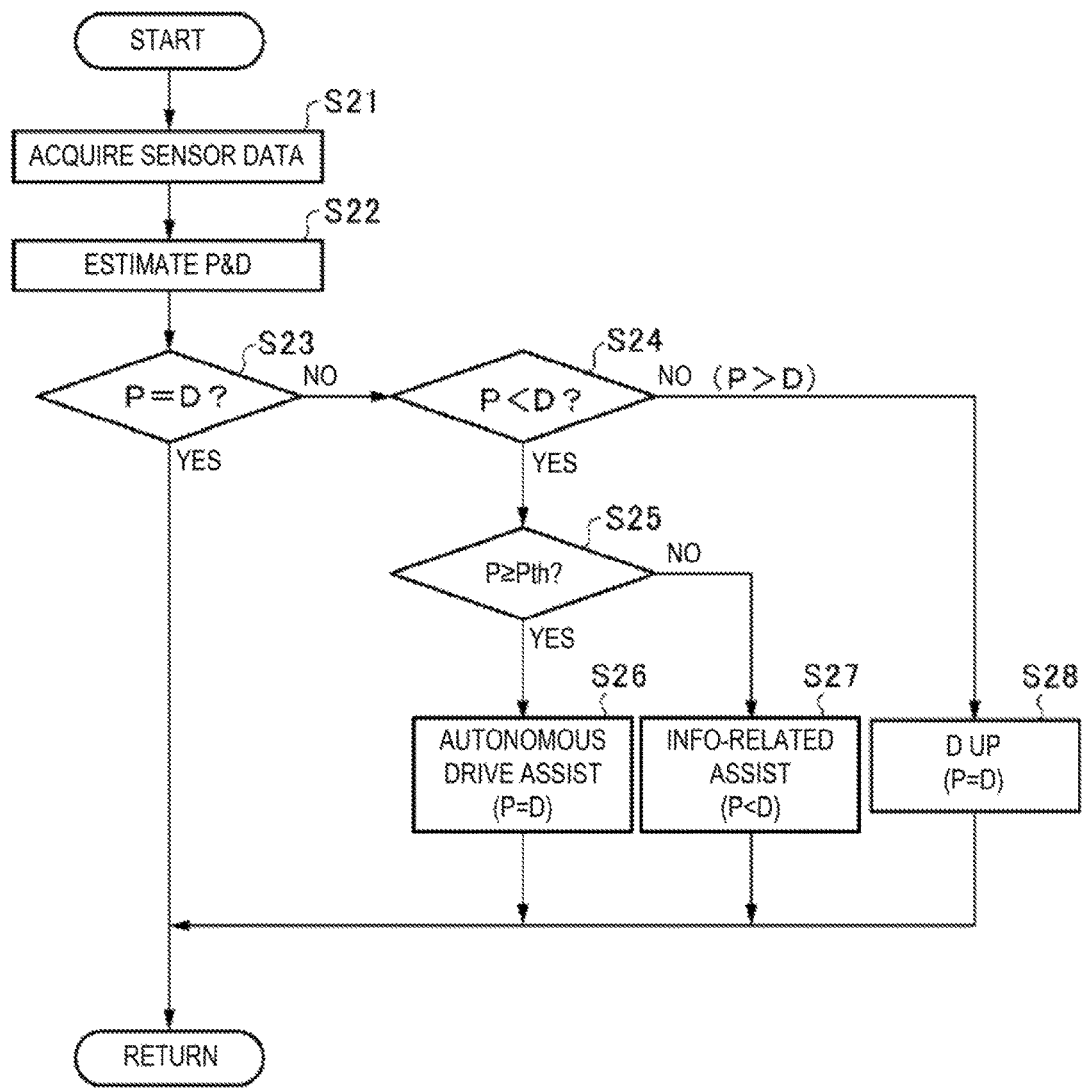
FIG. 11 is a flowchart of the drive assistance processing according to the modification of the present disclosure.

Next, a vehicle drive assistance system according to one modification is described with reference to FIGS. 10 and 11. FIG. 10 is a chart illustrating the drive assistance processing and FIG. 11 is a flowchart of the drive assistance processing.

FIG. 10 illustrates a situation where the reduction processing of the driving demand ("D DOWN" processing) is performed on the two vehicle drivers $E_3$ and $E_4$ illustrated in FIG. 8. Hereinafter, the redundant description to FIGS. 8 and 9 is omitted.

In the case of the driver $E_3$ (i.e., when the driving performance is high), the control unit 11 performs the reduction processing to balance out $P_3$ and $D_3$. In this case, out of the information-related, autonomous drive, and other processes, the autonomous drive processing is preferentially selected as the reduction processing. That is, the necessity of preferentially selecting other than the autonomous drive processing for enhancing the driving skill of the driver $E_3$ with high driving skill is low, but rather the autonomous drive processing that has a high reduction effect of the driving demand is taken priority for the driver $E_3$. Note that when the autonomous drive processing alone is insufficient for reducing the driving demand, another processing is additionally selected.

On the other hand, in the case of the driver $E_4$ (i.e., when the driving performance is low), the control unit 11 performs the reduction processing within a range that the driving demand does not drop until $P_4$ and $D_4$ come in balance. The target reduction value of the driving demand may be a value obtained by multiplying the difference $\Delta$ between $D_4$ and $P_4$ by the given coefficient k (0<k<1). Thus, the driver drives in a situation where the driving demand slightly exceeds the driving performance ($P_4$<$D_4$), and as a result, the driving skill enhances.

Further in this case, one or more of the information-related and other processes are suitably selected as the reduction processing. That is, for the driver $E_4$ with low driving skill, the processing other than the autonomous drive processing is selected. Thus, the driver performs the driving operation in a situation where the driving demand is slightly reduced (while maintaining $P_4$<$D_4$) without being taken away the opportunity to drive, and as a result, the driving skill enhances.

Further, between the information-related and other processings, the information-related processing, particularly the line-of-sight leading processing thereof is preferentially selected. Thus, by leading the line of sight of the driver to a given location far ahead of the vehicle, it is facilitated that the driver comprehends the traffic environmental situation as a skilled driver does. As a result, the enhancement of the driver skill is facilitated. Note that when the line-of-sight leading processing alone is insufficient for reducing the driving demand, another processing is additionally selected.

The on-board controller 1 (control unit 11) repeats the drive assistance processing illustrated in FIG. 11. Description of S11 to S25 and S28 is similar to S11 to S15 and S18 of FIG. 9 and is thus omitted.

If P is equal to or higher than the threshold $P_{th}$ (S25: YES, corresponding to the case of the driver $E_3$ in FIG. 10), the control unit 11 selects suitable processing from the reduction processing of the driving demand ("D DOWN" processing) and performs it (S26). Although one or more processes are selected here so that P and D come in balance, the autonomous drive processing is preferentially selected as described above.

If P is lower than the threshold $P_{th}$ (S25: NO, corresponding to the case of the driver $E_4$ in FIG. 10), the control unit 11 selects suitable processing from the reduction processing of the driving demand ("D DOWN" processing) and performs it (S27). In this case, one or more processes are selected from the reduction processing so that the driving demand does not drop until P and D come in balance. Here, one or more processes of the information-related processing (facilitating processing), particularly the line-of-sight leading processing is preferentially selected over other types of facilitating processing and performed as described above.

In this manner, in this embodiment, the driving demand D (and the driving performance P) is increased or reduced so that the driving demand D and the driving performance P have a suitable relationship according to the changes in the traffic environment and the condition of the driver (the driving skill, the physical state, and the mental state). Particularly in this embodiment, more suitable drive assistance is selected according to the skill of the driver. Thus, the enhancement of the driving skill is expected especially for a driver with low driving skill.

Next, effects of the vehicle drive assistance system of this embodiment are described.

The vehicle drive assistance system S of this embodiment includes the D estimating module 22 (required driving ability estimating module) configured to estimate the driving demand D (required driving ability) required for the driver ($E_3$ and $E_4$) to drive the vehicle based on the traffic environment around the vehicle and the drive assistance which is provided to the driver, the P estimating module 21 (current driving ability estimating module) configured to estimate the driving performance P (current driving ability) of the driver ($E_3$ and $E_4$), and the changing module 23 to perform the reduction processing in which the driving demand D is reduced when the driving performance P is lower than the driving demand D, the driving demand D being reduced less in a case where the driving performance P is lower than the threshold $P_{th}$ compared to a case where the driving performance P is equal to or higher than the threshold $P_{th}$ even when a difference between the driving demand D and the driving performance P is constant.

Thus, in this embodiment, the reduction amount of the driving demand D is smaller when the driving performance P is lower than the threshold $P_{th}$ than when the driving performance P is equal to or higher than the threshold $P_{th}$. Therefore, the driver $E_4$ who is estimated to have low driving skill drives in a situation where the drive assistance is slightly insufficient, and thus the enhancement of the driving skill is facilitated (see FIGS. 8 and 10).

Further, in this embodiment, when the driving performance P is equal to or higher than the threshold $P_{th}$, the changing module 23 performs, as the reduction processing, the autonomous drive processing in which one or more autonomous drive control systems (one or more of the autonomous drive assistance modes) are activated. When the driving performance P is lower than the threshold $P_{th}$, the changing module 23 performs, as the reduction processing, the facilitating processing in which the driver is facilitated to comprehend the traffic environmental situation (information-related processing) (see FIG. 10). Thus, in this embodiment, when the driving skill of the driver $E_3$ is high, the driving demand D is lowered by the autonomous drive processing without aiming for enhancing the driving skill, and when the driving skill of the driver $E_4$ is low, the driving skill is enhanced by facilitating comprehension of the traffic environment by the driver himself/herself.

Further, in this embodiment, the facilitating processing includes the information amount reduction processing in which the information presentation amount to the driver by the on-board information presentation devices 5 is reduced. Thus, the information processing amount that needs to instantly be processed by the driver is reduced. Therefore, for example, by narrowing the information presentation to high priority information, the driver is facilitated to comprehend the situation, and as a result, the driving demand D is lowered.

Further, in this embodiment, when the driving performance P is lower than the threshold $P_{th}$, the changing module 23 preferentially performs the line-of-sight leading processing of the facilitating processing, in which the line of sight of the driver is led to the given position ahead of the vehicle (around 150 to 250 m, or 200 m, ahead of the vehicle) by the line-of-sight leading device 5E. The driver $E_4$ who exerts relatively low driving performance P tends to have his/her line of sight at the close position (within 50 m ahead of the vehicle), and therefore, the driving demand D is effectively reduced by leading the line of sight. For this reason, in this embodiment, for the driver $E_4$ with low driving performance P, the line-of-sight leading processing is preferentially selected (see FIG. 10).

Furthermore, in this embodiment, the P estimating module 21 estimates the driving performance P of the driver based on the drive history data of the vehicle and at least one of the physical and mental states of the driver.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 On-board Controller
3 Vehicle Sensor
5 Information Presentation Device
5E Line-of-sight Leading Device
7 Vehicle Drive Control System
9 Windshield
9a Spot Light
9b Line-of-sight Leading Point
11 Control Unit
13 Memory
21 Current Driving Ability Estimating Module
22 Required Driving Ability Estimating Module
23 Changing Module
C Line of Sight
D Driving Demand
P Driving Performance
$P_{th}$ Threshold
S Vehicle Drive Assistance System
V Vehicle

What is claimed is:

1. A vehicle drive assistance system, comprising:
a processor configured to execute:
    a required driving ability estimating module to estimate a driver's driving ability required for driving a vehicle based on a traffic environment around the vehicle and drive assistance provided to the driver by the vehicle to output a scored required driving ability;
    a current driving ability estimating module to estimate a driver's current driving ability to output a scored current driving ability; and
    a changing module to perform reduction processing in which the scored required driving ability is reduced when the current driving ability is lower than the required driving ability, wherein
when the current driving ability is equal to or higher than a given threshold, the changing module performs, as the reduction processing, autonomous drive processing in which one or more autonomous drive control systems are activated, such that the scored required driving ability is reduced by a first reduction amount corresponding to the autonomous drive processing,
when the current driving ability is lower than the given threshold, the changing module performs, as the reduction processing, facilitating processing in which the driver is facilitated to comprehend the traffic environment, such that the scored required driving ability is reduced by a second reduction amount corresponding to the facilitating processing, and
the first reduction amount is greater than the second reduction amount, even when a difference between the scored required driving ability and the scored current driving ability is constant.

2. The vehicle drive assistance system of claim 1, wherein the facilitating processing includes information amount reduction processing in which an amount of information presented to the driver by an on-board information presentation device is reduced.

3. The vehicle drive assistance system of claim 1, wherein when the current driving ability is lower than the given threshold, the changing module preferentially performs line-of-sight leading processing in which the driver's line of sight is led to a given position ahead of the vehicle by a line-of-sight leading device, over other types of facilitating processing, the line-of-sight leading processing being included in the facilitating processing.

4. The vehicle drive assistance system of claim 1, wherein the current driving ability estimating module estimates the current driving ability based on drive history data of the vehicle and at least one of a physical state and a mental state of the driver.

* * * * *